United States Patent
Kim et al.

(10) Patent No.: US 10,380,724 B1
(45) Date of Patent: *Aug. 13, 2019

(54) LEARNING METHOD AND LEARNING DEVICE FOR REDUCING DISTORTION OCCURRED IN WARPED IMAGE GENERATED IN PROCESS OF STABILIZING JITTERED IMAGE BY USING GAN TO ENHANCE FAULT TOLERANCE AND FLUCTUATION ROBUSTNESS IN EXTREME SITUATIONS

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, INC., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,820

(22) Filed: Jan. 28, 2019

(51) Int. Cl.
  *G06K 9/00* (2006.01)
  *G06T 5/00* (2006.01)
  (Continued)

(52) U.S. Cl.
  CPC .............. *G06T 5/006* (2013.01); *G06K 9/628* (2013.01); *G06K 9/6215* (2013.01);
  (Continued)

(58) Field of Classification Search
  CPC ....... G06K 9/6257; G06T 7/246; G06T 15/10; G06T 19/006; G06T 2207/20081; G06F 17/11; G06N 3/0454
  See application file for complete search history.

(56) References Cited

U.S. PATENT DOCUMENTS

2018/0239951 A1* 8/2018 El-Zehiry .......... G06K 9/00147
2018/0336439 A1* 11/2018 Kliger ................. G06N 3/0454
(Continued)

*Primary Examiner* — Shefali D Goradia
(74) *Attorney, Agent, or Firm* — FisherBroyles, LLP; Susan M. Oiler (57) ABSTRACT

A method for learning reduction of distortion occurred in a warped image by using a GAN is provided for enhancing fault tolerance and fluctuation robustness in extreme situations. And the method includes steps of: (a) if an initial image is acquired, instructing an adjusting layer included in the generating network to adjust at least part of initial feature values, to thereby transform the initial image into an adjusted image; and (b) if at least part of (i) a naturality score, (ii) a maintenance score, and (iii) a similarity score are acquired, instructing a loss layer included in the generating network to generate a generating network loss by referring to said at least part of the naturality score, the maintenance score and the similarity score, and learn parameters of the generating network. Further, the method can be used for estimating behaviors, and detecting or tracking objects with high precision, etc.

18 Claims, 3 Drawing Sheets

(51) Int. Cl.
*G06K 9/62* (2006.01)
*G06T 7/00* (2017.01)
*G06N 3/08* (2006.01)
*G06N 3/04* (2006.01)
*H04N 5/232* (2006.01)

(52) U.S. Cl.
CPC ......... *G06K 9/6256* (2013.01); *G06K 9/6262* (2013.01); *G06N 3/04* (2013.01); *G06N 3/084* (2013.01); *G06N 3/088* (2013.01); *G06T 7/0002* (2013.01); *G06T 2207/20076* (2013.01); *G06T 2207/20081* (2013.01); *G06T 2207/20084* (2013.01); *G06T 2207/30252* (2013.01); *H04N 5/23264* (2013.01)

(56) References Cited

U.S. PATENT DOCUMENTS

2018/0341836 A1* 11/2018 Lim ...................... G06T 3/4053
2019/0035118 A1* 1/2019 Zhao .................... G06T 3/4046
2019/0080206 A1* 3/2019 Hotson ................ G06K 9/6264

* cited by examiner

INITIAL IMAGE

ADJUSTED IMAGE

LEARNING METHOD AND LEARNING DEVICE FOR REDUCING DISTORTION OCCURRED IN WARPED IMAGE GENERATED IN PROCESS OF STABILIZING JITTERED IMAGE BY USING GAN TO ENHANCE FAULT TOLERANCE AND FLUCTUATION ROBUSTNESS IN EXTREME SITUATIONS

FIELD OF THE DISCLOSURE

The present disclosure relates to a learning method, a learning device, a testing method and a testing device for use with an autonomous vehicle; and more particularly, to the learning method and the learning device for reducing distortion occurred in warped image by using GAN, and the testing method and the testing device using the same.

BACKGROUND OF THE DISCLOSURE

The CNNs may be used in a field of autonomous driving and they detect obstacles by analyzing images obtained through a camera attached to a vehicle, and detect free space, etc., so that the vehicle can be safely driven.

However, a method of allowing the autonomous driving of the vehicle using the CNNs as described above may be difficult to perform in a specific situation. In other words, the CNNs must use the images obtained through the camera, but if the images are shaken due to a camera shake or the like, then a jittering effect occurs in which the images change greatly for each frame of the images. If such jittering occurs, the CNNs cannot track the movement of objects on the images easily. Especially, this jittering effect occurs very frequently in the autonomous driving of military vehicles which frequently travel off-road, and a method for preventing this is very important.

As a conventional technique for preventing such jittering, there is a method of physically correcting the jittered images by measuring the movement of the camera, but, in this case, the weight of the camera module is increased, the cost thereof is expensive, and use of multiple devices increases the risk of malfunction. As an alternative technique, a software technique, which includes dividing an image into each grid, calculating each vector representing each movement of said each grid occurred by camera shaking, and warping each of the grids by referring to each of the vectors to thereby reduce jittering, may be considered.

However, according to the software technique, it takes into consideration only the optical flow of an object of an image, and it causes a problem of generating a large image distortion in the process of correcting the image in which jittering occurs, resulting in an unrealistic corrected image, and undetectable distorted objects thereof.

SUMMARY OF THE DISCLOSURE

It is an object of the present disclosure to solve all the aforementioned problems.

It is another object of the present disclosure to alleviate a problem of a distortion occurred in a warped image generated in a process of stabilizing a jittered image by reducing the distortion using GAN In accordance with one aspect of the present disclosure, there is provided a learning method for learning reduction of distortion occurred in a warped image generated in a process of stabilizing a jittered image by using a GAN (Generative Adversarial Network) including a generating network and a discriminating network, including steps of: (a) a learning device, if at least one initial image is acquired, instructing an adjusting layer included in the generating network to adjust at least part of initial feature values corresponding to pixels included in the initial image, to thereby transform the initial image into at least one adjusted image; and (b) the learning device, if at least part of (i) at least one naturality score representing at least one probability of the adjusted image being determined as real by the discriminating network, (ii) at least one maintenance score representing whether one or more initial objects included in the initial image are included in the adjusted image with their characteristics maintained, and (iii) at least one similarity score representing a degree of similarity between the initial image and the adjusted image are acquired, instructing a loss layer included in the generating network to generate a generating network loss by referring to said at least part of the naturality score, the maintenance score and the similarity score, and learn parameters of the generating network by backpropagating the generating network loss.

As one example, at the step of (b), the discriminating network determines said at least one probability of the adjusted image being real or fake by referring to a feature map corresponding to the adjusted image, to thereby generate the naturality score.

As one example, the discriminating network generates a discriminating network loss by referring to the adjusted image, at least one real training image, which is further acquired, and their corresponding GTs, and learns parameters of itself by backpropagating the discriminating network loss, to thereby determine one or more probabilities of its one or more inputted images, including the adjusted image, being real or fake.

As one example, at the step of (b), an object detection network generates one or more class scores on one or more ROIs corresponding to one or more adjusted objects included in the adjusted image, and generate the maintenance score by referring to the class scores.

As one example, at the step of (b), a comparing layer included in the generating network generates the similarity score by referring to information on differences between the initial feature values and their corresponding adjusted feature values included in the adjusted image.

As one example, the similarity score is generated by further referring to the initial feature values.

As one example, at the step of (b), the generating network loss allows the parameters included in the generating network to be learned to make an integrated score calculated by referring to at least part of the naturality score, the maintenance score and the similarity score be larger.

As one example, the integrated score is generated by referring to a weighted sum of at least part of the naturality score, the maintenance score and the similarity score.

In accordance with another aspect of the present disclosure, there is provided a testing method for testing reduction of distortion occurred in a warped image generated in a process of stabilizing a jittered image by using a GAN (Generative Adversarial Network) including a generating network and a discriminating network, including a step of: on condition that (1) a learning device has instructed an adjusting layer included in the generating network to adjust at least part of initial feature values for training corresponding to pixels included in at least one initial training image, to thereby transform the initial training image into at least one adjusted training image, and (2) the learning device has instructed a loss layer included in the generating network to generate a generating network loss by referring to at least part of (i) at least one naturality score representing at least one probability of the adjusted training image being determined as real by the discriminating network, (ii) at least one maintenance score representing whether one or more initial objects included in the initial training image are included in the adjusted training image with their characteristics maintained, and (iii) at least one similarity score representing a degree of similarity between the initial training image and the adjusted training image, and learn parameters of the generating network by backpropagating the generating network loss; a testing device instructing the adjusting layer included in the generating network to adjust at least part of initial feature values for testing corresponding to pixels included in at least one initial test image, to thereby transform the initial test image into at least one adjusted test image.

In accordance with still another aspect of the present disclosure, there is provided a learning device for learning reduction of distortion occurred in a warped image generated in a process of stabilizing a jittered image by using a GAN (Generative Adversarial Network) including a generating network and a discriminating network, including: at least one memory that stores instructions; and at least one processor configured to execute the instructions to: perform processes of (I), if at least one initial image is acquired, instructing an adjusting layer included in the generating network to adjust at least part of initial feature values corresponding to pixels included in the initial image, to thereby transform the initial image into at least one adjusted image, and (II), if at least part of (i) at least one naturality score representing at least one probability of the adjusted image being determined as real by the discriminating network, (ii) at least one maintenance score representing whether one or more initial objects included in the initial image are included in the adjusted image with their characteristics maintained, and (iii) at least one similarity score representing a degree of similarity between the initial image and the adjusted image are acquired, instructing a loss layer included in the generating network to generate a generating network loss by referring to said at least part of the naturality score, the maintenance score and the similarity score, and learn parameters of the generating network by backpropagating the generating network loss.

As one example, at the process of (II), the discriminating network determines said at least one probability of the adjusted image being real or fake by referring to a feature map corresponding to the adjusted image, to thereby generate the naturality score.

As one example, the discriminating network generates a discriminating network loss by referring to the adjusted image, at least one real training image, which is further acquired, and their corresponding GTs, and learns parameters of itself by backpropagating the discriminating network loss, to thereby determine one or more probabilities of its one or more inputted images, including the adjusted image, being real or fake.

As one example, at the process of (II), an object detection network generates one or more class scores on one or more ROIs corresponding to one or more adjusted objects included in the adjusted image, and generate the maintenance score by referring to the class scores.

As one example, at the process of (II), a comparing layer included in the generating network generates the similarity score by referring to information on differences between the initial feature values and their corresponding adjusted feature values included in the adjusted image.

As one example, the similarity score is generated by further referring to the initial feature values.

As one example, at the process of (II), the generating network loss allows the parameters included in the generating network to be learned to make an integrated score calculated by referring to at least part of the naturality score, the maintenance score and the similarity score be larger.

As one example, the integrated score is generated by referring to a weighted sum of at least part of the naturality score, the maintenance score and the similarity score.

In accordance with still yet another aspect of the present disclosure, there is provided a testing device for reduction of distortion occurred in a warped image generated in a process of stabilizing a jittered image by using a GAN (Generative Adversarial Network) including a generating network and a discriminating network, including: at least one memory that stores instructions; and at least one processor, on condition that (1) a learning device has instructed an adjusting layer included in the generating network to adjust at least part of initial feature values for training corresponding to pixels included in at least one initial training image, to thereby transform the initial training image into at least one adjusted training image, and (2) the learning device has instructed a loss layer included in the generating network to generate a generating network loss by referring to at least part of (i) at least one naturality score representing at least one probability of the adjusted training image being determined as real by the discriminating network, (ii) at least one maintenance score representing whether one or more initial objects included in the initial training image are included in the adjusted training image with their characteristics maintained, and (iii) at least one similarity score representing a degree of similarity between the initial training image and the adjusted training image, and learn parameters of the generating network by backpropagating the generating network loss; configured to execute the instructions to: perform a process of instructing the adjusting layer included in the generating network to adjust at least part of initial feature values for testing corresponding to pixels included in at least one initial test image, to thereby transform the initial test image into at least one adjusted test image.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 1:
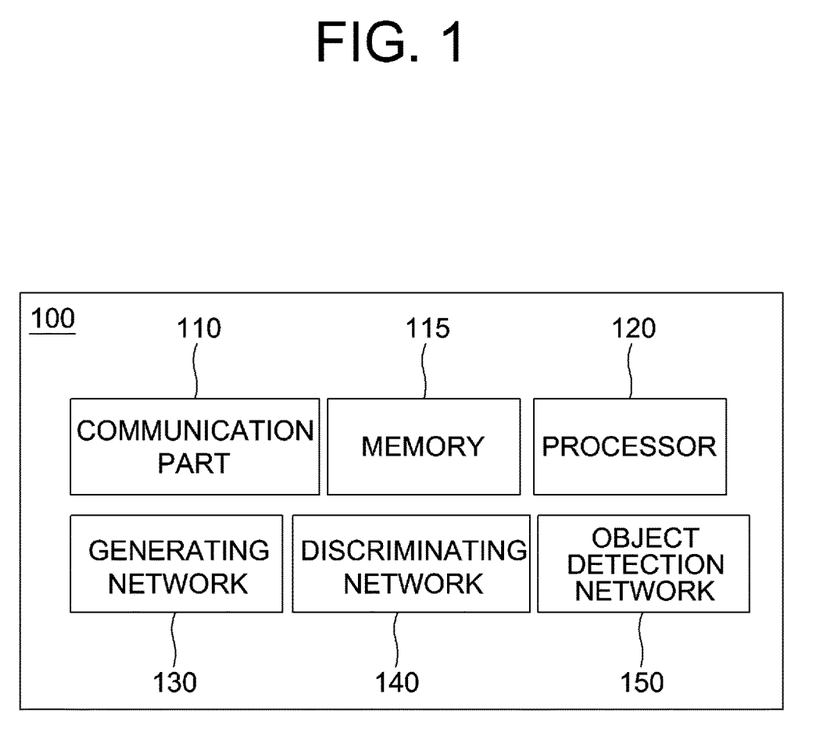
FIG. 1 is a drawing schematically illustrating a learning device performing a method for reducing distortion occurred in a warped image generated in a process of stabilizing a jittered image by using a GAN (Generative Adversarial Network) in accordance with one example embodiment of the present disclosure.

FIG. 1 is a drawing schematically illustrating a learning device performing a learning method for reducing distortion occurred in a warped image generated in a process of stabilizing a jittered image by using a GAN (Generative Adversarial Network) in accordance with one example embodiment of the present disclosure.

By referring to FIG. 1, the learning device 100 may include a generating network 130, a discriminating network 140 and an object detection network 150, which are components to be described later. Processes of input/output and computations of the generating network 130, the discriminating network 140 and the object detection network 150 may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the processes to be disclosed later. Such description of the learning device 100 does not exclude an integrated device including any combination of a processor, a memory, a medium, or any other computing components.

So far configurations of the learning device 100 performing the learning method for reducing the distortion occurred in the warped image generated in the process of stabilizing the jittered image by using the GAN have been explained. Below the learning method will be explained, by referring to FIG. 2.

Figure 2:
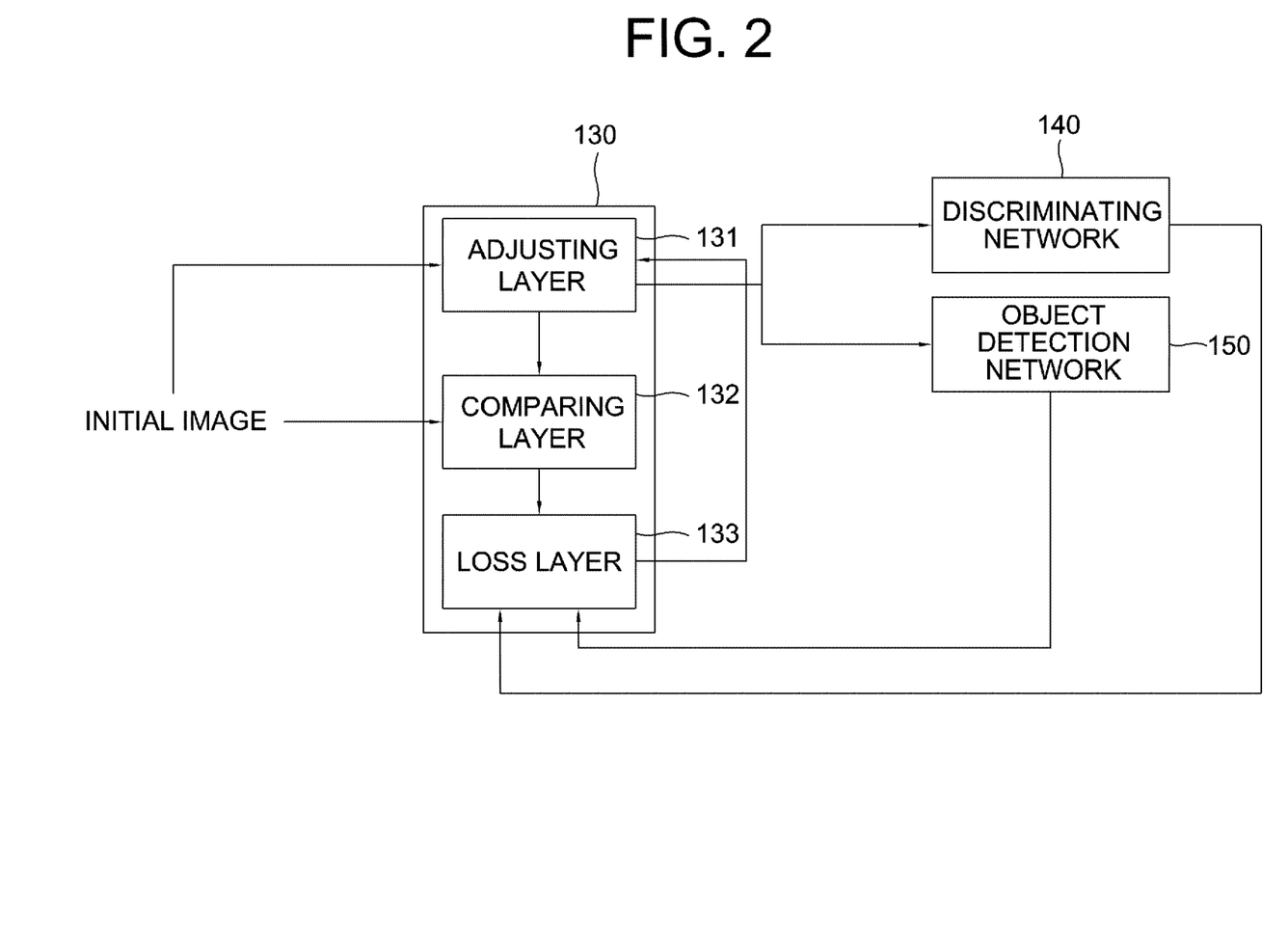
FIG. 2 is a drawing schematically illustrating a process of reducing the distortion occurred in the warped image generated in the process of stabilizing the jittered image by using the GAN in accordance with one example embodiment of the present disclosure.

FIG. 2 is a drawing schematically illustrating a process of reducing the distortion occurred in the warped image generated in the process of stabilizing the jittered image by using the GAN in accordance with one example embodiment of the present disclosure.

By referring to FIG. 2, if at least one initial image is inputted to a generating network 130, at least one adjusted image may be generated by an adjusting layer 131 included in the generating network 130. After, a loss layer 133 included in the generating network 130 may (i) acquire scores on the adjusted image generated by a comparing layer 132 included in the generating network 130, a discriminating network 140 and an object detection network 150, (ii) generate a generating network loss by referring to the scores, and (iii) learn parameters of the generating network 130 by backpropagating the generating network loss.

Specifically, the learning device 100 may acquire the initial image. The initial image may be one of stabilized images, which were generated by the process of reducing jittering in jittered images. Herein, the process of reducing the jittering may include a process of dividing the jittered images into several grids, a process of calculating jittering vectors which represent movements of the grids, which were caused by shaken camera, and a process of warping jittering images which moves each of the grids in each of opposite directions of each of the jittering vectors. The problem is that, the process of warping may cause some distortion on the stabilized images, since it moves the grids in different directions. Thus, the initial image, generated through said processes above may include some of distorted objects inside.

If said at least one initial image is acquired, the learning device 100 may instruct the generating network 130 to transform the initial image into said at least one adjusted image. Specifically, the learning device 100 may instruct the adjusting layer 131 included in the generating network 130 to transform the initial image into the adjusted image by adjusting at least part of initial feature values corresponding to pixels included in the initial image.

The adjusting layer 131 may transform the initial image into the adjusted image by applying one or more convolutional operations and one or more deconvolution operations to the initial feature values. Herein, the initial feature values may include color values in case the initial image is an RGB formatted image. In case the initial image is not the RGB formatted image, those may include other sort of values. Also, in case the initial image includes values of several channels, the initial values may include these.

After, the adjusted image may be delivered to the comparing layer 132 included in the generating network 130, the discriminating network 140 and the object detection network 150, and used to generate each of the scores to be used for generating the generating network loss. Below, processes of generating said each of scores will be explained. Among those, a process performed by the discriminating network 140 will be explained first.

First, the discriminating network 140 may generate at least one naturality score representing at least one probability of the adjusted image being determined as real. Specifically, the discriminating network 140 may generate a feature map corresponding to the adjusted image by applying one or more convolutional operations to the adjusted image, and determine said at least one probability of the adjusted image being real or fake by referring to the feature map, to thereby generate the naturality score. In order to generate the naturality score, the discriminating network 140 may be learned concurrently with the generating network 130.

Specifically, while acquiring the adjusted image generated by the generating network 130, the discriminating network 140 may further acquire real training images, which are on a real world, and their corresponding GTs. Herein, each of the GTs may represent whether each of corresponding image is real or fake. After, the discriminating network 140 may determine whether each of its inputted images, including the adjusted image and the real training images, is real or fake by referring to each of feature maps generated by applying one or more convolutional operations to each of its inputted images. And, the discriminating network 140 may generate a discriminating network loss by referring to results of determination and their corresponding GTs, and learn parameters of itself by backpropagating the discriminating network loss.

Thanks to the learning processes as shown above, the discriminating network 140 can be learned concurrently with the generating network 130.

As another example embodiment, the discriminating network 140 may determine probabilities of sub-regions of the adjusted image being real or fake, and the naturality score may be generated by referring to the probabilities. Herein, the sub-regions may be selected by a method called "sliding-window". Specifically, a first sub-region may be selected in the adjusted image, and a second sub-region may be selected by slightly moving the first region, and so on.

Second, the object detection network 150 may generate at least one maintenance score representing whether one or more initial objects included in the initial image are included in the adjusted image with their characteristics maintained. Specifically, the object detection network 150 may (i) acquire each of ROIs on its inputted image from RPN, (ii) generate each of feature maps by applying one or more convolutional operations to each of the ROIs, and (iii) generate each of class scores, including probabilities corresponding to classes of each of objects included in each of the ROIs, by applying FC operations to each of the feature maps. Herein, specific information on the class scores may be explained with an example. For instance, if the object detection network 150 classifies detected objects in three classes including a pedestrian class, a vehicle class and a background class, a specific class score corresponding to a specific object may include three components, first one being a probability of the specific object included in a specific ROI being pedestrian, second one being that of the specific object being a vehicle, and third one being that of the specific object being a background. After the rest of the class scores are generated similarly, the object detection network 150 may generate the maintenance score by referring to each of the class scores.

In one example, the maintenance score may be calculated as a sum of each of the partial maintenance scores, corresponding to each of the class scores. Herein, a specific partial maintenance score, among the partial maintenance scores, corresponding to said specific object, may be calculated as a sum of (i) a largest one among probabilities of the specific object being included in object classes, not background classes, and (ii) difference between 1 and a probability of the specific object being included in the background class. For example, if the specific class score is (0.7, 0.2, 0.1), the specific partial maintenance score may be calculated as $0.7+(1-0.1)=1.6$.

Contrary to the discriminating network 140, the object detection network 150 may not learn concurrently with the generating network 130. Rather, it may have been learned before the learning processes of the generating network 130.

Third, the comparing layer 132 may generate the similarity score representing a degree of similarity between the initial image and the adjusted image. Specifically, the comparing layer 132 may generate information on differences between the initial feature values and their corresponding adjusted feature values included in the adjusted image, and generate the similarity score by using it.

In one example, the comparing layer 132 may generate said information on differences by calculating each of Euclidean distances between each of the initial feature values and each of its corresponding adjusted feature values, and generate sum information by summing each of Euclidean distances of each of the initial feature values from an original point, whose components are all zeros. Thereafter, the comparing layer 132 may generate the similarity score by dividing the information on differences by the sum, and subtracting the divided result from 1.

So far specific methods for generating the naturality score, the maintenance score and the similarity score were explained. An explanation on how those scores can be used will be provided below, along with an explanation on a loss layer 133.

The learning device 100 may instruct the loss layer 133 to generate the generating network loss by referring to at least part of the naturality score, the maintenance score and the similarity score. The generating network loss allows the parameters included in the generating network to be learned to make an integrated score be larger. Herein, the integrated score may be calculated by referring to at least part of the naturality score, the maintenance score and the similarity score. In one example, the integrated score may be generated by referring to a weighted sum of at least part of the naturality score, the maintenance score and the similarity score. The loss layer may generate the generating network loss by following a formula below $$G^* = \underset{G}{\mathrm{argmax}}(E_1(G) + \alpha E_2(G) + \beta E_3(G))$$

$$E_1(G) = D(G(I)) \text{ or } \frac{1}{\left(\left\lfloor\frac{W-K_w}{S}\right\rfloor+1\right)\left(\left\lfloor\frac{H-K_h}{S}\right\rfloor+1\right)} \sum_{x=0}^{\left\lfloor\frac{W-K_w}{S}\right\rfloor}\sum_{y=0}^{\left\lfloor\frac{H-K_h}{S}\right\rfloor} D\big(G(I)_{Sx+1:Sx+K_w, Sy+1:Sy+K_h}\big)$$

$$E_2(G) = \frac{1}{R}\sum_{i=1,\ldots,R}\left(\underset{j=1,\ldots,L}{\max} F\big(C(G(I))_{x_1^{(i)}:x_2^{(i)}, y_1^{(i)}:y_2^{(i)}}\big)_j + \left(1 - F\big(C(G(I))_{x_1^{(i)}:x_2^{(i)}, y_1^{(i)}:y_2^{(i)}}\big)_0\right)\right)$$

$$E_3(G) = 1 - \frac{\|I - G(I)\|_F^2}{\|I\|_F^2}$$

In the formula above, $E_1(G)$ may denote the naturality score, $E_2(G)$ may denote the maintenance score, and $E_3(G)$ may denote the similarity score. And, $\alpha$ and $\beta$ may denote weights on corresponding terms respectively.

First, $E_1(G)$ may be $$\frac{1}{\left(\left\lfloor\frac{W-K_w}{S}\right\rfloor+1\right)\left(\left\lfloor\frac{H-K_h}{S}\right\rfloor+1\right)} \sum_{x=0}^{\left\lfloor\frac{W-K_w}{S}\right\rfloor}\sum_{y=0}^{\left\lfloor\frac{H-K_h}{S}\right\rfloor} D\big(G(I)_{Sx+1:Sx+K_w, Sy+1:Sy+K_h}\big)$$

in case of using the method called "sliding window" as shown above, or may be $D(G(I))$, which denotes the probability of the adjusted image being determined as real by the discriminating network 140, in case of using the basic embodiment as shown above. In case of using the method called "sliding window", $$\frac{1}{\left(\left\lfloor\frac{W-K_w}{S}\right\rfloor+1\right)\left(\left\lfloor\frac{H-K_h}{S}\right\rfloor+1\right)} \sum_{x=0}^{\left\lfloor\frac{W-K_w}{S}\right\rfloor}\sum_{y=0}^{\left\lfloor\frac{H-K_h}{S}\right\rfloor} D\big(G(I)_{Sx+1:Sx+K_w, Sy+1:Sy+K_h}\big)$$

term is for summing each of the probabilities of each of the sub-regions included in the adjusted image being real or fake, and normalizing the resultant value. $K_w$ may denote a width of the regions, $K_h$ may denote a height of the regions, W may denote a width of the adjusted image, and H may denote a height of the adjusted image. Further, Sx may denote a distance between a left side of the region and a left side of the adjusted image, and Sy may denote a distance between an upper side of the region and an upper side of the adjusted image. By following the formula, $E_1(G)$ may function as described before.

Second, in $E_2(G)$, $$\underset{j=1,\ldots,L}{\max} F\big(C(G(I))_{x_1^{(i)}:x_2^{(i)}, y_1^{(i)}:y_2^{(i)}}\big)_j$$

term may denote a largest one among the probabilities of an i-th object being included in object classes, not the background class, and $$\left(1 - F\big(C(G(I))_{x_1^{(i)}:x_2^{(i)}, y_1^{(i)}:y_2^{(i)}}\big)_0\right)$$

term may denote a difference between 1 and a probability of the i-th object being included in the background class. Herein, $x_1^{(i)}:x_2^{(i)}, y_1^{(i)}:y_2^{(i)}$ may denote a location of a bounding box including the i-th object.

Third, in $E_3(G)$, I may denote a vector corresponding to the initial feature values, and G(I) may denote a vector corresponding to the adjusted feature values.

Below, the reason why the generating network loss should make the integrated score larger will be explained below.

First, by allowing the naturality score to be larger, the adjusted image may look more naturally. If objects included in the adjusted image are distorted, the adjusted image may not look natural. As the distortion is reduced from the objects included in the adjusted image, the discriminating network 140 may determine the adjusted image as real more confidently, so that the larger naturality score may be generated. Thus, by allowing the naturality score to be larger, the distortion of the initial objects can be reduced in the adjusted image.

Second, by allowing the maintenance score to be larger, the objects included in the adjusted image may maintain their own characteristics. As the objects included in the adjusted image are detected easily by the object detecting network 150, the larger maintenance score may be generated. Thus, by allowing the maintenance score to be larger, characteristics of the initial objects may be conserved even after the adjusting processes.

Third, by allowing the similarity score to be larger, creation of new objects, which do not correspond to the initial objects, can be prevented in the adjusted image. If only the naturality score and the maintenance score are used without the similarity score, parameters of the adjusting layer 131 may be learned to create new objects in the adjusted image, exceeding its own function of just adjusting distorted initial objects. Thus, by allowing the similarity score to be larger, unwanted new objects can be prevented in the adjusted image.

As mentioned before, the integrated score may be generated by referring to the weighted sum of at least part of the naturality score, the maintenance score and the similarity score. Herein, each of the weights corresponding to each of the scores can be adjusted by a user. For example, if the adjusted image and the initial image are too similar that distortions of initial objects are not reduced, a weight on the similarity score may be lessened.

After the generating network loss is generated as shown above, the learning device 100 may instruct the loss layer 133 to learn the parameters of the generating network 130 by backpropagating the generating network loss.

So far the learning processes have been explained. Below, their corresponding testing processes will be explained. For reference, in the description below, the phrase "for training" or "training" is added for terms related to the learning process, and the phrase "for testing" or "testing" is added for terms related to the testing process, to avoid possible confusion.

Specifically, on condition that (1) the learning device 100, if at least one initial training image is acquired, has instructed the adjusting layer 131 included in the generating network 130 to adjust at least part of initial feature values for training corresponding to pixels included in the initial training image, to thereby transform the initial training image into at least one adjusted training image, and (2) the learning device 100, if at least part of (i) at least one naturality score representing at least one probability of the adjusted training image being determined as real by the discriminating network, (ii) at least one maintenance score representing whether one or more initial training objects included in the initial training image are included in the adjusted training image with their characteristics maintained, and (iii) at least one similarity score representing a degree of similarity between the initial training image and the adjusted training image are acquired, have instructed the loss layer 132 included in the generating network 130 to generate a generating network loss by referring to said at least part of the naturality score, the maintenance score and the similarity score, and learn the parameters of the generating network 130 by backpropagating the generating network loss, a testing device, if at least one initial test image is acquired, instructing the adjusting layer 131 included in the generating network 130 to adjust at least part of initial feature values for testing corresponding to pixels included in the initial test image, to thereby transform the initial test image into at least one adjusted test image.

In the testing processes, the testing device may include configurations of the learning device 100 described in the FIG. 1, except the discriminating network 140, the object detection network 150, and the comparing layer 132 and the loss layer 133 included in the generating network 130.

Figure 3:
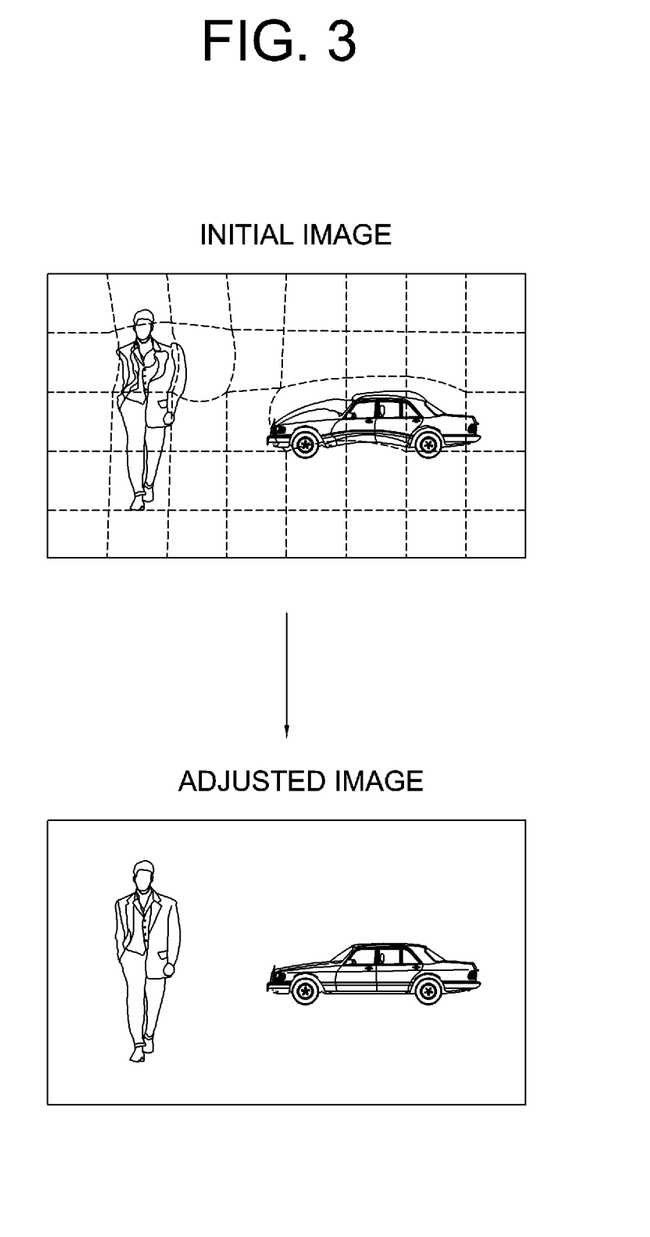
FIG. 3 is a drawing schematically illustrating effects of the process of reducing the distortion occurred in the warped image generated in the process of stabilizing the jittered image by using the GAN in accordance with one example embodiment of the present disclosure.

Some positive effects of the testing processes above can be seen in FIG. 3.

FIG. 3 is a drawing schematically illustrating effects of the process of reducing the distortion occurred in the warped image generated in the process of stabilizing the jittered image by using the GAN in accordance with one example embodiment of the present disclosure.

By referring to FIG. 3, it can be seen that the initial objects are distorted because of the image warping as mentioned before. If the method in accordance with one example embodiment of the present disclosure is applied to the initial image, the initial image can be transformed to the adjusted image as shown in FIG. 3, whose distortion have been greatly reduced.

It is a positive effect of the present disclosure to alleviate a problem of a distortion occurred in a warped image generated in a process of stabilizing a jittered image by reducing the distortion using the GAN.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of alleviating a problem of procuring the sets of the training images in the non-RGB format by transforming the sets of the training images in the RGB format into those in the non-RGB format with a cycle GAN (Generative Adversarial Network).

The method in accordance with the present disclosure may be used for enhancing fault tolerance and fluctuation robustness in extreme situations, and may be used for estimating behaviors, and detecting or tracking objects with high precision, etc.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for learning reduction of distortion occurred in a warped image generated in a process of stabilizing a jittered image by using a GAN (Generative Adversarial Network) including a generating network and a discriminating network, comprising steps of:
    (a) a learning device, if at least one initial image is acquired, instructing an adjusting layer included in the generating network to adjust at least part of initial feature values corresponding to pixels included in the initial image, to thereby transform the initial image into at least one adjusted image; and
    (b) the learning device, if at least part of (i) at least one naturality score representing at least one probability of the adjusted image being determined as real by the discriminating network, (ii) at least one maintenance score representing whether one or more initial objects included in the initial image are included in the adjusted image with their characteristics maintained, and (iii) at least one similarity score representing a degree of similarity between the initial image and the adjusted image are acquired, instructing a loss layer included in the generating network to generate a generating network loss by referring to said at least part of the naturality score, the maintenance score and the similarity score, and learn parameters of the generating network by backpropagating the generating network loss.

2. The learning method of claim 1, wherein, at the step of (b), the discriminating network determines said at least one probability of the adjusted image being real or fake by referring to a feature map corresponding to the adjusted image, to thereby generate the naturality score.

3. The learning method of claim 2, wherein the discriminating network generates a discriminating network loss by referring to the adjusted image, at least one real training image, which is further acquired, and their corresponding GTs, and learns parameters of itself by backpropagating the discriminating network loss, to thereby determine one or more probabilities of its one or more inputted images, including the adjusted image, being real or fake.

4. The learning method of claim 1, wherein, at the step of (b), an object detection network generates one or more class scores on one or more ROIs corresponding to one or more adjusted objects included in the adjusted image, and generate the maintenance score by referring to the class scores.

5. The learning method of claim 1, wherein, at the step of (b), a comparing layer included in the generating network generates the similarity score by referring to information on differences between the initial feature values and their corresponding adjusted feature values included in the adjusted image.

6. The learning method of claim 5, wherein the similarity score is generated by further referring to the initial feature values.

7. The learning method of claim 1, wherein, at the step of (b), the generating network loss allows the parameters included in the generating network to be learned to make an integrated score calculated by referring to at least part of the naturality score, the maintenance score and the similarity score be larger.

8. The learning method of claim 7, wherein the integrated score is generated by referring to a weighted sum of at least part of the naturality score, the maintenance score and the similarity score.

9. A testing method for testing reduction of distortion occurred in a warped image generated in a process of stabilizing a jittered image by using a GAN(Generative Adversarial Network) including a generating network and a discriminating network, comprising a step of:
on condition that (1) a learning device has instructed an adjusting layer included in the generating network to adjust at least part of initial feature values for training corresponding to pixels included in at least one initial training image, to thereby transform the initial training image into at least one adjusted training image, and (2) the learning device has instructed a loss layer included in the generating network to generate a generating network loss by referring to at least part of (i) at least one naturality score representing at least one probability of the adjusted training image being determined as real by the discriminating network, (ii) at least one maintenance score representing whether one or more initial objects included in the initial training image are included in the adjusted training image with their characteristics maintained, and (iii) at least one similarity score representing a degree of similarity between the initial training image and the adjusted training image, and learn parameters of the generating network by backpropagating the generating network loss; a testing device instructing the adjusting layer included in the generating network to adjust at least part of initial feature values for testing corresponding to pixels included in at least one initial test image, to thereby transform the initial test image into at least one adjusted test image.

10. A learning device for learning reduction of distortion occurred in a warped image generated in a process of stabilizing a jittered image by using a GAN (Generative Adversarial Network) including a generating network and a discriminating network, comprising:
at least one memory that stores instructions; and
at least one processor configured to execute the instructions to: perform processes of (1) if at least one initial image is acquired, instructing an adjusting layer included in the generating network to adjust at least part of initial feature values corresponding to pixels included in the initial image, to thereby transform the initial image into at least one adjusted image, and (II) if at least part of (i) at least one naturality score representing at least one probability of the adjusted image being determined as real by the discriminating network, (ii) at least one maintenance score representing whether one or more initial objects included in the initial image are included in the adjusted image with their characteristics maintained, and (iii) at least one similarity score representing a degree of similarity between the initial image and the adjusted image are acquired, instructing a loss layer included in the generating network to generate a generating network loss by referring to said at least part of the naturality score, the maintenance score and the similarity score, and learn parameters of the generating network by backpropagating the generating network loss.

11. The learning device of claim 10, wherein, at the process of (II), the discriminating network determines said at least one probability of the adjusted image being real or fake by referring to a feature map corresponding to the adjusted image, to thereby generate the naturality score.

12. The learning device of claim 11, wherein the discriminating network generates a discriminating network loss by referring to the adjusted image, at least one real training image, which is further acquired, and their corresponding GTs, and learns parameters of itself by backpropagating the discriminating network loss, to thereby determine one or more probabilities of its one or more inputted images, including the adjusted image, being real or fake.

13. The learning device of claim 10, wherein, at the process of (II), an object detection network generates one or more class scores on one or more ROIs corresponding to one or more adjusted objects included in the adjusted image, and generate the maintenance score by referring to the class scores.

14. The learning device of claim 10, wherein, at the process of (II), a comparing layer included in the generating network generates the similarity score by referring to information on differences between the initial feature values and their corresponding adjusted feature values included in the adjusted image.

15. The learning device of claim 14, wherein the similarity score is generated by further referring to the initial feature values.

16. The learning device of claim 10, wherein, at the process of (II), the generating network loss allows the parameters included in the generating network to be learned to make an integrated score calculated by referring to at least part of the naturality score, the maintenance score and the similarity score be larger.

17. The learning device of claim 16, wherein the integrated score is generated by referring to a weighted sum of at least part of the naturality score, the maintenance score and the similarity score.

18. A testing device for reduction of distortion occurred in a warped image generated in a process of stabilizing a jittered image by using a GAN (Generative Adversarial Network) including a generating network and a discriminating network, comprising:

at least one memory that stores instructions; and at least one processor, on condition that (1) a learning device has instructed an adjusting layer included in the generating network to adjust at least part of initial feature values for training corresponding to pixels included in at least one initial training image, to thereby transform the initial training image into at least one adjusted training image, and (2) the learning device has instructed a loss layer included in the generating network to generate a generating network loss by referring to at least part of (i) at least one naturality score representing at least one probability of the adjusted training image being determined as real by the discriminating network, (ii) at least one maintenance score representing whether one or more initial objects included in the initial training image are included in the adjusted training image with their characteristics maintained, and (iii) at least one similarity score representing a degree of similarity between the initial training image and the adjusted training image, and learn parameters of the generating network by backpropagating the generating network loss; configured to execute the instructions to: perform a process of instructing the adjusting layer included in the generating network to adjust at least part of initial feature values for testing corresponding to pixels included in at least one initial test image, to thereby transform the initial test image into at least one adjusted test image.

* * * * *

UNITED STATES PATENT AND TRADEMARK OFFICE
CERTIFICATE OF CORRECTION

PATENT NO. : 10,380,724 B1
APPLICATION NO. : 16/258820
DATED : August 13, 2019
INVENTOR(S) : Kye-Hyeon Kim Page 1 of 1

It is certified that error appears in the above-identified patent and that said Letters Patent is hereby corrected as shown below:

In the Claims

In Claim 10 at Column 14, Line 8, '(1)' should read -(I)-.

Signed and Sealed this
Seventeenth Day of September, 2019

Andrei Iancu
*Director of the United States Patent and Trademark Office*